(12) United States Patent
Baer et al.

(10) Patent No.: US 8,279,179 B2
(45) Date of Patent: Oct. 2, 2012

(54) SYSTEM FOR DETERMINING POINTER POSITION, MOVEMENT, AND ANGLE

(75) Inventors: Richard L. Baer, Los Altos, CA (US);
Ramakrishna Kakarala, Santa Clara, CA (US); Dietrich W. Vook, Los Altos, CA (US); Xuemei Zhang, Mountain View, CA (US); Izhak Baharav, Palo Alto, CA (US); Paul L. Corredoura, Redwood City, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 564 days.

(21) Appl. No.: 12/477,404

(22) Filed: Jun. 3, 2009

(65) Prior Publication Data
US 2009/0237274 A1   Sep. 24, 2009

Related U.S. Application Data

(62) Division of application No. 10/870,881, filed on Jun. 17, 2004, now Pat. No. 7,557,799.

(51) Int. Cl.
*G09G 5/08* (2006.01)
(52) U.S. Cl. ......... 345/166; 345/163; 345/165; 250/221
(58) Field of Classification Search .......... 345/166–168, 345/156–158, 163; 250/221; 356/328
See application file for complete search history.

(56) References Cited

U.S. PATENT DOCUMENTS

| | | | |
|---|---|---|---|
| 4,260,979 A * | 4/1981 | Smith | 382/313 |
| 5,742,041 A * | 4/1998 | Liu | 235/462.08 |
| 6,310,988 B1 | 10/2001 | Flores et al. | |
| 6,566,723 B1 | 5/2003 | Vook et al. | |
| 6,606,421 B1 | 8/2003 | Shaken et al. | |
| 6,618,038 B1 * | 9/2003 | Bohn | 345/164 |
| 6,700,561 B1 | 3/2004 | Christensen, Jr. et al. | |
| 6,723,516 B1 | 4/2004 | Tom-Moy et al. | |
| 6,731,794 B2 | 5/2004 | Zhang et al. | |
| 6,752,317 B2 | 6/2004 | Dymetman et al. | |
| 6,844,871 B1 * | 1/2005 | Hinckley et al. | 345/163 |
| 6,885,878 B1 | 4/2005 | Borgstrom et al. | |
| 2001/0006846 A1 | 7/2001 | Cao et al. | |
| 2001/0023095 A1 | 9/2001 | Kopley et al. | |
| 2001/0024864 A1 | 9/2001 | Kopley et al. | |
| 2002/0117682 A1 | 8/2002 | Vande Voorde et al. | |
| 2002/0158986 A1 | 10/2002 | Baer | |
| 2002/0165509 A1 | 11/2002 | Baer et al. | |
| 2002/0167600 A1 | 11/2002 | Baer | |
| 2002/0171752 A1 | 11/2002 | Baer | |
| 2002/0171852 A1 | 11/2002 | Zhang et al. | |
| 2002/0176621 A1 | 11/2002 | Zhang et al. | |

(Continued)

*Primary Examiner* — Lun-Yi Lao
*Assistant Examiner* — Shaheda Abdin

(57) ABSTRACT

An a data input system includes an encoded pad having position encoding and a data input device adapted to image a portion of the encoded pad to determine position and orientation of the data input device relative to the encoded pad. The encoding pad includes a plurality of correlation windows. Each correlation window includes a primary encoding marker in form of vertical line segment and a set of secondary encoding markers in form of diagonal line segments, at least one diagonal line segment intersecting the vertical line segment at an intersection angle. Spacing of the diagonal line segments encodes the X-axis position of the input device relative to the encoding pad. Intersection angle encodes the Y-axis position of the input device relative to the encoding pad. Angle of the primary encoding marker vertical line segment within the frame of the captured image encodes the angular orientation of the input device relative to the axes of the encoded pad.

16 Claims, 6 Drawing Sheets

U.S. PATENT DOCUMENTS

| | | |
|---|---|---|
| 2002/0179813 A1 | 12/2002 | Baer |
| 2002/0186308 A1 | 12/2002 | Baer |
| 2002/0191854 A1 | 12/2002 | Kakarala et al. |
| 2002/0191973 A1 | 12/2002 | Hofer et al. |
| 2003/0001078 A1 | 1/2003 | Baharav et al. |
| 2003/0016877 A1 | 1/2003 | Baharav et al. |
| 2003/0021487 A1 | 1/2003 | Baer |
| 2003/0030648 A1 | 2/2003 | Baer |
| 2003/0030744 A1 | 2/2003 | Baer |
| 2003/0052981 A1 | 3/2003 | Kakarala et al. |
| 2003/0091242 A1 | 5/2003 | Kakarala et al. |
| 2003/0107100 A1 | 6/2003 | Cao et al. |
| 2003/0111440 A1 | 6/2003 | Roitman et al. |
| 2003/0111704 A1 | 6/2003 | Theil et al. |
| 2003/0128409 A1 | 7/2003 | Vook et al. |
| 2003/0160157 A1 | 8/2003 | Baharav et al. |

\* cited by examiner

SYSTEM FOR DETERMINING POINTER POSITION, MOVEMENT, AND ANGLE

CROSS REFERENCE TO RELATED APPLICATIONS

This is a divisional of application Ser. No. 10/870,881, filed Jun. 17, 2004 now U.S. Pat. No. 7,557,799, the entire disclosure of which is incorporated by into this application by reference.

BACKGROUND

The present invention relates to data input systems, and more particularly, to a data input system including an improved computer mouse and mouse pad.

In computer user interfaces, pointing devices such as computer mouse are often used to enter movement information. For example, an optical mouse is commonly used as an input device to provide displacement information which is used to move a mouse pointer on a screen. Here, displacement means a measurement of distance moved from a starting position to an ending position. The optical mouse, however, does not provide position information. That is, using the current generation optical mouse, its position (within a mouse pad on which the optical mouse sits) is not available. Position information can be obtained if a graphic input tablet and its associated graphic input tablet pen are used as the input device; however, the graphic input tablet and pen system does not provide displacement information available from the mouse.

Further, the optical mouse does not provide orientation information. That is, using the current generation optical mouse, its orientation (direction that the mouse is pointing relative to the mouse pad grid) information is not available. Orientation information can be obtained if a joystick or a keypad is used as the input device; however, neither the joystick nor the keypad provides displacement information available from the mouse. For certain applications such as computer gaming and device control using an input device, it may be desirable for an input system to be able to provide positional, directional, and displacement information to a host computer.

Accordingly, there remains a need for an input system capable of providing positional, directional, and displacement information.

SUMMARY

The need is met by the present invention. In a first embodiment of the present invention, a data input system includes an encoded pad having position encoding and a data input device adapted to image a portion of the encoded pad to determine position and orientation of the data input device relative to the encoded pad.

In a second embodiment of the present invention, an encoded pad includes a plurality of correlation windows. Each correlation window includes a primary encoding marker and a set of secondary encoding markers adapted to indicate positional information in a first axis of the encoded pad. A relationship between the primary marker and at least one secondary encoding marker indicates positional information in a second axis of the encoded pad.

In a third embodiment of the present invention, an encoded pad includes a variation of a first reflectance along a first axis of the encoded pad, the variation of the first reflectance material adapted to indicate positional information in the first axis of the encoded pad. Further, the encoded pad includes a variation of a second reflectance along a second axis of the encoded pad, the variation of the second reflectance material adapted to indicate positional information in the second axis of the encoded pad.

Other aspects and advantages of the present invention will become apparent from the following detailed description, taken in conjunction with the accompanying drawings, illustrating by way of example the principles of the invention.

DETAILED DESCRIPTION

The present invention will now be described with reference to FIGS. 1 through 9 which illustrate various embodiments of the present invention. In the Figures, some sizes of structures or portions may be exaggerated relative to sizes of other structures or portions for illustrative purposes and, thus, are provided to illustrate the general structures of the present invention. Furthermore, various aspects of the present invention are described with reference to a structure or a portion positioned "on" or "over" relative to other structures, portions, or both. As will be appreciated by those of skill in the art, relative terms and phrases such as "on" or "over" are used herein to describe one structure's or portion's relationship to another structure or portion as illustrated in the Figures. It will be understood that such relative terms are intended to encompass different orientations of the device in addition to the orientation depicted in the Figures. For example, if the device in the Figures is turned over, rotated, or both, the structure or the portion described as "on" or "over" other structures or portions would now be oriented "below," "under," "left of," "right of," "in front of," or "behind" the other structures or portions.

As shown in the Figures for the purposes of illustration, embodiments of the present invention are exemplified by a data input system including an encoded pad and a data input device adapted to view the encoded pad to determine its position and orientation of the input device relative to the encoded pad. That is, the data input device (for example, a computer mouse) of the present invention need not be moved in order to communicate its position and angular information. Further, the data input device also operates similar to the prior art mouse in determining and transmitting displacement information.

Figure 1:
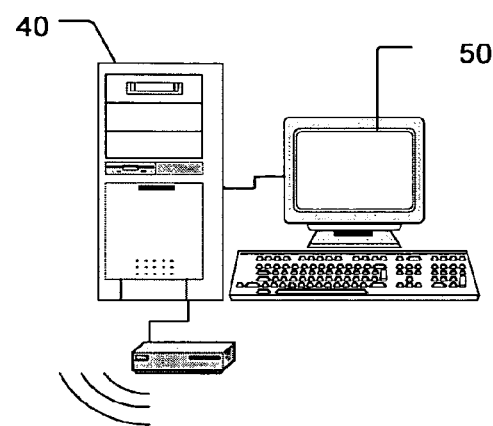
FIG. 1 illustrates a data input system in accordance with one embodiment of the present invention.
Figure 1:
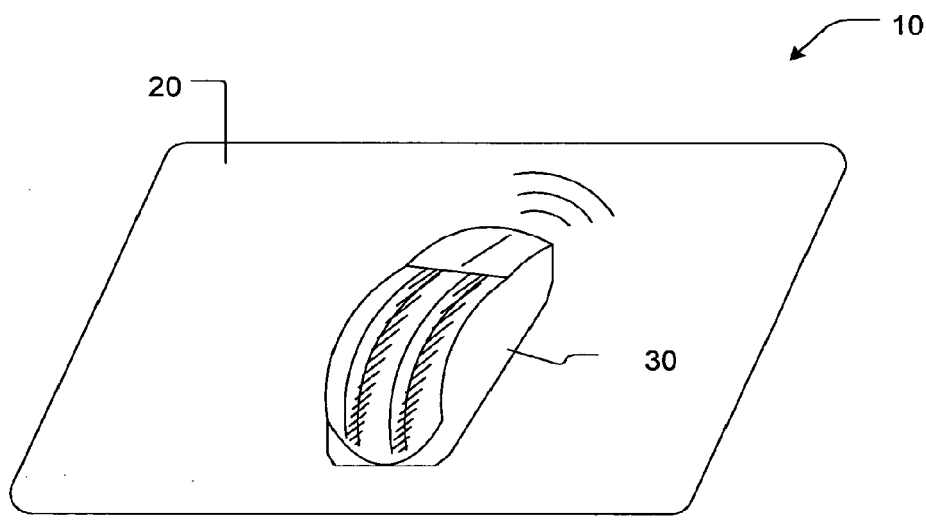

FIG. 1 illustrates a data input system 10 including an encoded pad 20 having position and orientation encoding and a data input device 30 adapted to view the encoded pad 20 to determine position and orientation of the data input device 30 relative to the encoded pad 20. In FIG. 1, the data input device 30 is illustrated as an optical computer mouse 30; however, the present invention can be implemented as other types of data input devices such as, for example only, a modified keyboard, joy stick, and tablet-pens system. The optical computer mouse 30 can be configured to communicate with a host computer system 40 connected to a displayed apparatus 50 such as a computer monitor 50.

Figure 2:
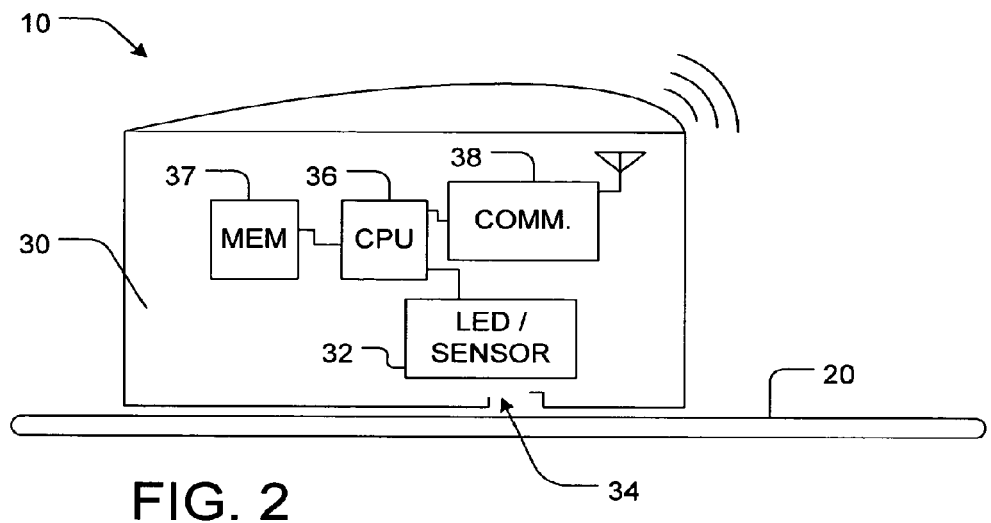
FIG. 2 illustrates data input device portion of the data input system in accordance with one embodiment of the present invention in more detail.
Figure 3A:
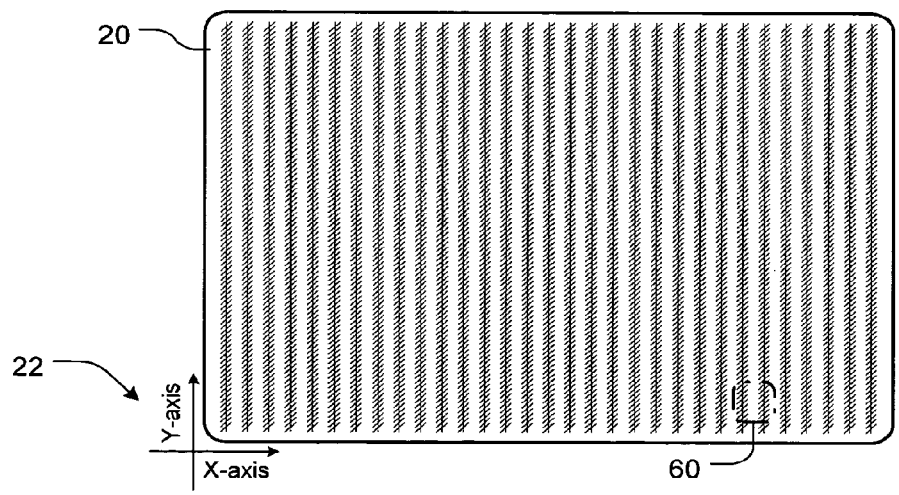
FIGS. 3A, 3B, and 4 illustrate encoded pad portion of the data input system in accordance with one embodiment of the present invention in more detail.
Figure 3B:
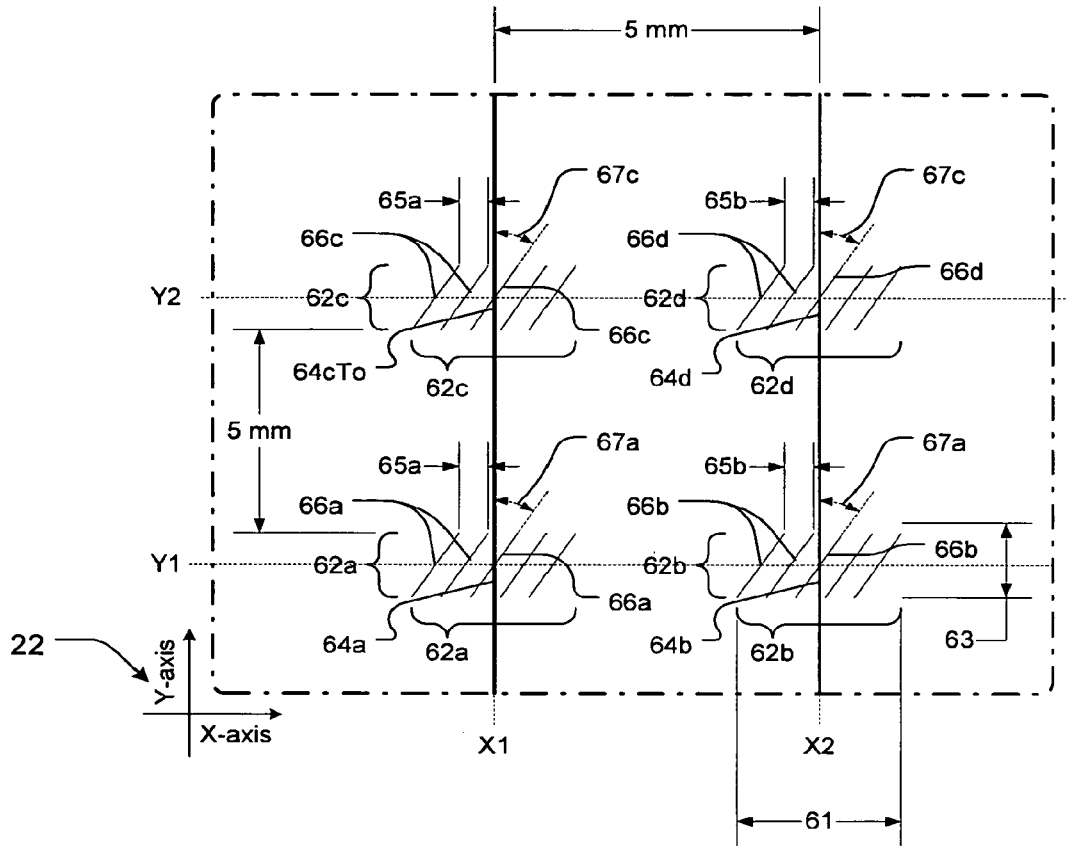

FIG. 2 is a simplified block diagram of the optical computer mouse 30 of Figure and a side view of the encoded pad 20 of FIG. 1. FIG. 3A illustrates a top view of the encoded pad 20 and FIG. 3B illustrates a portion 60 of the encoded pad 20 in more detail. Referring to FIGS. 2 through 3B, the data input system 10 includes an encoded pad 20 having position encoding and defining a two dimensional plane in the X-axis and Y-axis as illustrated in FIG. 2A using encoded pad axes indicator 22. The data input device 30 is illustrated as an optical computer mouse 30 for convenience. The optical computer mouse 30 includes an image sensor 32 adapted to image a relatively small portion of the encoded pad 20 through an optical opening 34 that may be covered with an optically clear lens. The image of the small portion of the encoded pad 20 is used to determine position and orientation of the optical computer mouse 30 relative to the encoded pad 20. For convenience, the two dimensional plane of the encoding pad is indicated by the axes indicator 22 and reference number 22.

The image sensor 32 includes, for example, a 30 by 30 array of photo detectors capturing an area of 2 millimeters (mm) by 2 mm square portion ("image size") of the encoded pad 20 for analysis. The image sensor 32 captures these images many times a second, for example 1000 times a second, such that when the optical computer mouse 30 slides on the encoded pad 20, slightly different portion of the encoded pad is captured.

In FIG. 3B illustrates the portion 60 of the encoded pad 20 in more detail. Continuing to refer to FIGS. 2 through 3B, the encoded pad 20 includes a plurality of correlation windows four of which are illustrated in the portion 60 of FIG. 3B as correlation windows 62*a*, 62*b*, 62*c*, and 62*d*. For convenience, reference number 62 is used to refer to correlation windows in a generic sense. A particular correlation window is designated with number 62 concatenated with a letter of the alphabet. Each correlation window 62 has lateral dimensions 61 and 63 defining a correlation window area that is smaller than the image size.

In the illustrated embodiment, the plurality of correlation windows 62 is laid out in a grid pattern within the X-Y plane 22 of the encoded pad 20. Each correlation window includes a number of elements illustrated, as an example, within the first correlation window 62*a*. The first correlation window 62*a* includes a primary encoding marker 64*a* and a set of secondary encoding markers 66*a*. In the illustrated sample embodiment, the primary encoding marker 64*a* is a portion of a vertical line segment running along the Y-axis of the two dimensional plane 22 of the encoded pad 20 and the secondary encoding markers 66*a* are diagonal line segments 66*a* at least one of which intersect the primary encoding marker 64*a* at an angle. In FIG. 3B, to avoid clutter, only three of six secondary encoding markers are designated with the reference number 66*a*.

For convenience, reference number 64 is used to refer to primary encoding markers in a generic sense. A particular primary encoding marker is designated with number 64 concatenated with a letter of the alphabet. For convenience, reference number 66 is used to refer to a set of secondary encoding markers in a generic sense. A particular primary set of secondary encoding markers is designated with number 66 concatenated with a letter of the alphabet.

In the illustrated sample embodiment, the secondary encoding markers are adapted to indicate positional information in the first axis, X-axis, of the encoding pad. The encoding is accomplished by varying the spacing of the diagonal line segments 66*a* between the correlation windows 62. For example, the first correlation window 62*a* includes a set of secondary encoding markers (diagonal line segments) 66*a* having a first spacing 65*a*, the first spacing 65*a* encoding its position, X1, in the X-axis; and a second correlation window 62*b* includes a set of secondary encoding markers (diagonal line segments) 66*b* having a second spacing 65*b* the second spacing 65*b* encoding its position, X2, in the X-axis.

The second spacing 65*b* is different than the first spacing 65*a*. All correlation windows encoding the same position X1 share the same first spacing 65*a* value. For example, a third correlation window 62*c* has set of secondary encoding markers (diagonal line segments) 66*c* having a first spacing 65*a* to indicate that it too has the same position X1 in the X-axis. Likewise, the fourth correlation window 62*d*, having the same position X2 in the X-axis as the correlation window 62*b*, has the same second spacing 65*b* encoding its position, X2, in the X-axis as the second correlation window 62*b*.

For each correlation window 62, the positional information in the second axis, the Y-axis, of the encoding pad 20 is encoded in an angular relationship between the primary marker 64 and at least one secondary encoding marker 66. For example, in the correlation window 62, one of the secondary encoding markers 66*a* intersects the primary encoding marker 64*a* at a first angle 67*a*. The first angle 67*a* encodes position, Y1, of the first correlation window 62*a* in the Y-axis. The second correlation window 62*b* also at location Y1; thus the angular relationship between its primary encoding marker 64*b* and its secondary encoding marker 66*b* is the first angle 67*a*, the same angular relationship that exists in the first correlation windows 62*a*. However, the third correlation window 64*c* has a Y-axis position of Y2. For this reason, its angular relationship between its primary encoding marker 64*c* and its secondary encoding markers 66*c* is third angle 67*c* that is different than the first angle 67*a* of the first correlation windows 62*a*.

To distinguish the primary encoding markers 64 from the secondary encoding markers 66, the primary encoding markers 64 are more pronounced then the secondary encoding markers 66. For example, the primary encoding markers 64 can be darker, wider, or of a different color and then the secondary encoding markers 66. Actual implementation of the primary encoding markers and the secondary inquiry markers may very; however, in the illustrated embodiment, the primary encoding markers run along at least one of the dimensional axes of the encoded pad 20. In particular, in the illustrated embodiment, the primary encoding markers run along the second dimensional axis, the Y-axis and are implemented as vertical line segments.

Figure 4:
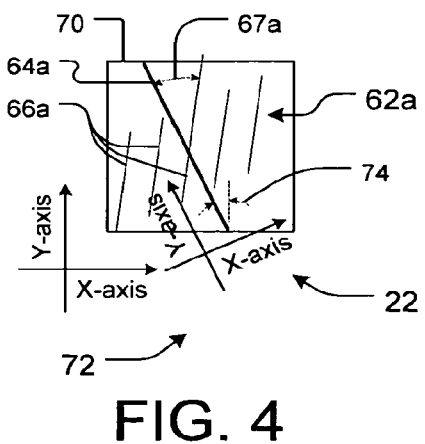
Figure 5:
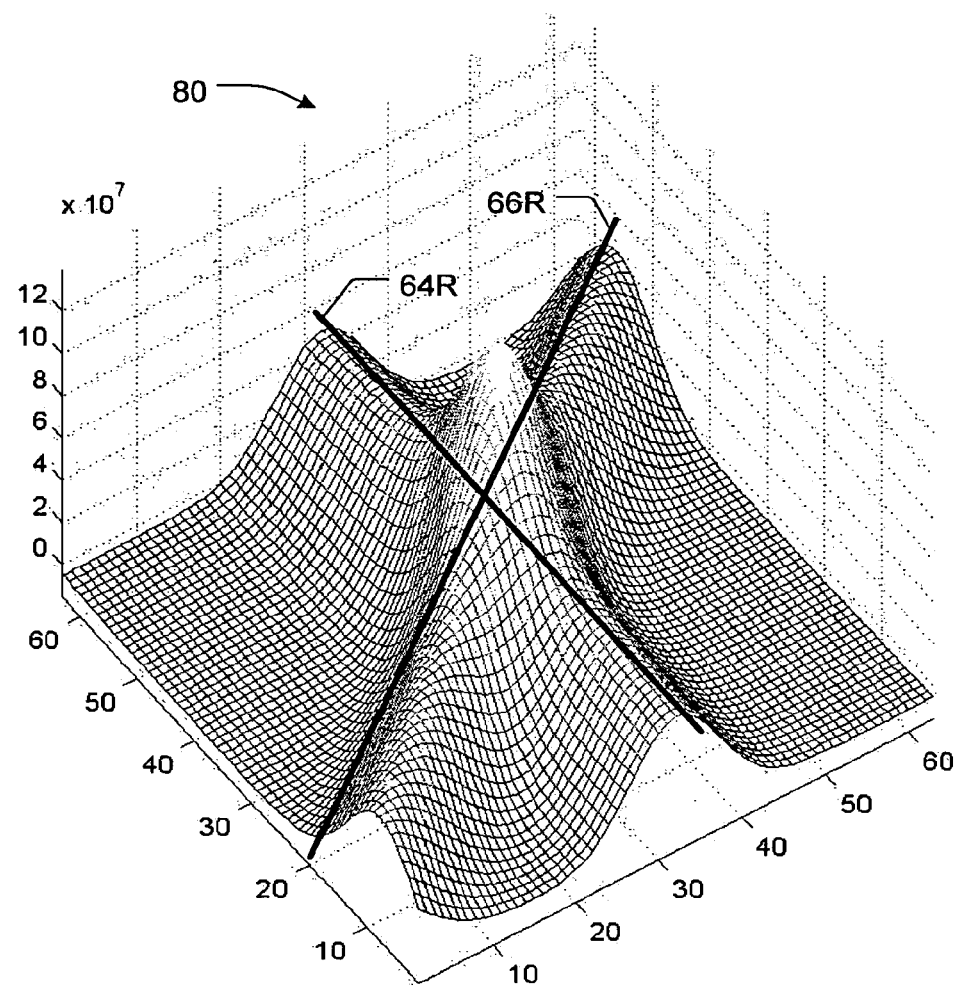
FIG. 5 illustrates a three dimensional correlation diagram.

Referring again to FIG. 2, the optical computer mouse 30 includes the image sensor 32 adopted to capture an imager of at least a portion of the encoded pad 20. FIG. 4 illustrates one possible captured image R 70 as the first correlation window 62*a* of FIG. 3B. Referring to FIGS. 2, 3A, and 4, the optical computer mouse 30 further includes a processor 36 connected to the image sensor 32. The processor 36 is programmed determine, from the captured image R 70, a first encoded value for position relative to a first axis of the encoded pad, a second encoded value for position relative to a second axis of the encoded pad, and a third value for orientation angle relative of the encoded pad.

The captured image R 70 is auto correlated. The autocorrelation function can be expressed as $$A_{RR}(dx, dy) = \sum_{n=0}^{N-1} \sum_{m=0}^{N-1} R[n, m]R[n + dx, m + dy] \qquad \text{(Eq. 1)}$$

where
n and m are indexes used within Equation 1 (Eq. 1);
N is the number of pixels in one axis in the N by N image that is being autocorrelated;
R[n, m] is the value of the captured image R at pixel n, m; and
R[n+dx, m+dy] is a displaced version of R[n, m].

Note that when the autocorrelation function has the following properties:
1. The autocorrelation has a maximum value at (0, 0). That is, $|A_{RR}(dx,dy)| \leq A_{RR}(0,0)$.
2. The autocorrelation is symmetric about the origin. That is, $A_{RR}(dx,dy)=A_{RR}(-dx,-dy)$.
3. The autocorrelation has the same period as the captured image R. That is, if R[n+T,m]=R[n,m], then $A_{RR}(dx+T, dy)=A_{RR}(dx,dy)$.
4. The autocorrelation does not change under translation of the captured image R.
5. The autocorrelation rotates with the image R by the same angle.

These properties of the autocorrelation mean that if the input image consists of two stripes meeting at an angle as illustrated in FIG. 4 in the captured image 70, then the autocorrelation of the captured image 70 can be used to identify the first and second encoded markers (line segments) because the line segments appears as data ridges of the autocorrelation. Further, the primary encoding marker line segment 64*a* is more prominent (compared to the secondary encoding marker line segments) in the autocorrelation because of its thicker, pronounced implementation on the encoding pad 20. The autocorrelated data for a portion of the captured image 70 is illustrated in a three dimensional correlation diagram 78 in FIG. 5. The correlation diagram 78 includes ridges 64R and 66R corresponding to the primary marker line segment 64*a* and the secondary marker line segment 66*a*, respectively.

This, the processor 36 is programmed to determine, from the captured image 70, the first encoded value (the X-axis positional information) by determining the spacing 65*a* of the secondary encoding marker line segments as discussed above. Further, the processor 36 is programmed to determine, from the captured image 70, the second encoded value (the Y-axis positional information) by determining the intersection angle 67*a* as discussed above. The spacing 65*a* value and the intersection angle 67*a* can be converted into X and Y positional value using a predetermined algorithm or using a conversion table within memory 37 of the input device 30. In short, in the illustrated sample embodiment, the first encoded value is translated into an X-axis position and the second encoded value is translated into a Y-axis position and, together, they represent a location on the X-Y plane of the encoded plane.

Finally, the processor 36 is programmed to determine, from the captured image 70, a third value for orientation angle relative of the encoded pad 20. The orientation angle is the angular orientation of the input device 30 relative to the encoded pad's coordinate system 22. In fact, the input device 30 has its own orientation represented by the axis indicator 72 of the captured image 70. As illustrated in FIGS. 3B and 4, the first correlation window 62*a* includes a primary encoding marker 64*a* aligned with the Y-axis of the encoded pad plane 22. In the Figures, the captured image axes 72 are rotated relative to the Y-axis of the encoded pad plane 22 as represented by the primary encoding marker 64*a*. The angular difference 74 indicates the orientation angle of the input device 30 relative to the encoded pad 20.

Once these values are determined, the information can be transmitted to a host computer 40 of FIG. 1 via a communication module 38 of the input device 30 as illustrated in FIGS. 1 and 2.

In a sample implementation, a 30×30 pixel images that are about 2 mm on a side on the surface. A 5×5 Autocorrelation is computed for each image. On a striped pattern, measured angle estimation to 10 degrees (but 180 degree ambiguity due to autocorrelation) is available. In fact, some optical mice include multiple filters to select from at one of several degree angles. Interpolation is available down to ¼ pixels on most surfaces. Therefore, the spacing 65, or periodicity of the secondary encoding markers can be up to eight levels from the +/−2 index shifts in the 5×5 autocorrelation. Hence, with a common optical mouse, absolute position on the encoded pad can be estimated to varying resolution depending on the sizes of the captured image, the sizes of the primary and secondary markers, and precision of the implemented software in sub-pixel resolution.

A typical mouse pad, for example the encoded pad 20, can measure 6 inches by 8 inches and can be divided into 25×25 rectangles. Each rectangle is far larger than an image taken by the mouse. Thus, the position is determinable to approximately 25% of the number of rectangles. Referring again to FIG. 2, if the location of the opening 34 of the optical computer mouse 30 is such that its field of view is not over a correlation window 62, it merely needs to be moved (normal mousing) so that it moves over, or at least crosses one of the correlation windows 62. Then, its current position (at any instant in time) can be determined by determining the position of that correlation window which the mouse 30 crossed and then combining to that the displacement information available from the mouse 30. The method of determining the displacement information is well known in the art. That is, the displacement information is based on cross correlating a first captured image with a second captured image which is a displaced version of the first captured image. Optical mice use an image sensor which determines displacement from a pair of N×N images, called a reference R (first captured image) and a comparison C (second captured image). Typically, the displacement is measured by minimizing a matching function between R and C, such as the cross-correlation function:

$$X_{RC}(dx, dy) = \sum_{n=0}^{N-1} \sum_{m=0}^{N-1} R[n, m]C[n + dx, m + dy]$$

This function can be minimized over candidate values of displacement (dx,dy).

Depending on implementation, it is not necessary to autocorrelate the entire captured image which may be 30 pixels by 30 pixels. In fact, to save processing requirements, it may be preferable to autocorrelate a portion of the captured image as autocorrelation box with the autocorrelation box size ranging from 5 by 5 pixels to 30 pixels by 30 pixels (the entire image).

Figure 6:
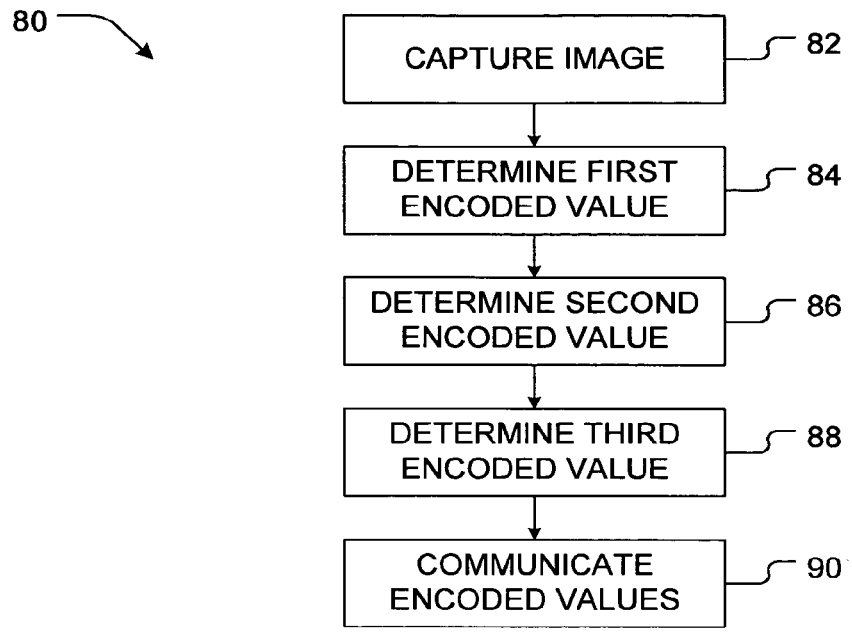
FIG. 6 is a flowchart illustrating one aspect of the present invention.

These steps of providing positional information are outline in a flowchart diagram 80 of FIG. 6. Referring to FIG. 6, a portion of the encoded pad 20 is captured as an image. Step 82. Then, the image is autocorrelated and analyzed to determining a first encoded value for position relative to a first axis of the encoded pad (step 84) and to determining a second encoded value for position relative to a second axis of the encoded pad (step 86). Further, the image is used to determining the orientation angle relative of the encoded pad. Step 88. Finally, the positional information is communicated to a host computer. Step 90.

Referring again to FIGS. 3A and 2B, the primary encoding markers 64 are separated by a distance not less than the distance of the size of the captured image 70 of FIG. 4. In the illustrated embodiment, the primary encoding markers 64 are separated by, for example, 5 mm though this can be different depending on implementation. The correlation windows 66 are also separated by a distance not less than the distance of the size of the captured image 70 of FIG. 4, for example 5 mm.

Other methods besides or in addition to autocorrelation can be used to extract information from an encoded mouse pad. For example, position or orientation information could be encoded in the color (or what is accurate and more general, the wavelength-dependent reflectance) of the pad. Note that the wavelength-based encoding could use wavelengths that fall outside of the range visible to humans, such as infra-red or ultraviolet. One or more color sensors could be used to extract the additional information. Alternatively, the reflectivity of the pad could vary with position. In another approach a pseudorandom pattern could be printed on the pad that would cause the shape of the autocorrelation function to depend on position.

In the color case, position could be encoded by making the chromaticity of the pad a unique function of position. For example, a pad could be created with a uniform distribution of green, a linear variation of red in the x-direction and a linear variation of blue in the y-direction. The ratio of red to green could be measured to determine the x-axis position of the mouse, and the ratio of blue to green could be measured to determine the y-axis position. Orientation could be encoded by making the chromaticity of the pad vary monotonically along one or two axes. A pair of color sensors could be used to determine the orientation by measuring the chromaticity at opposite ends of the mouse.

Figure 7:
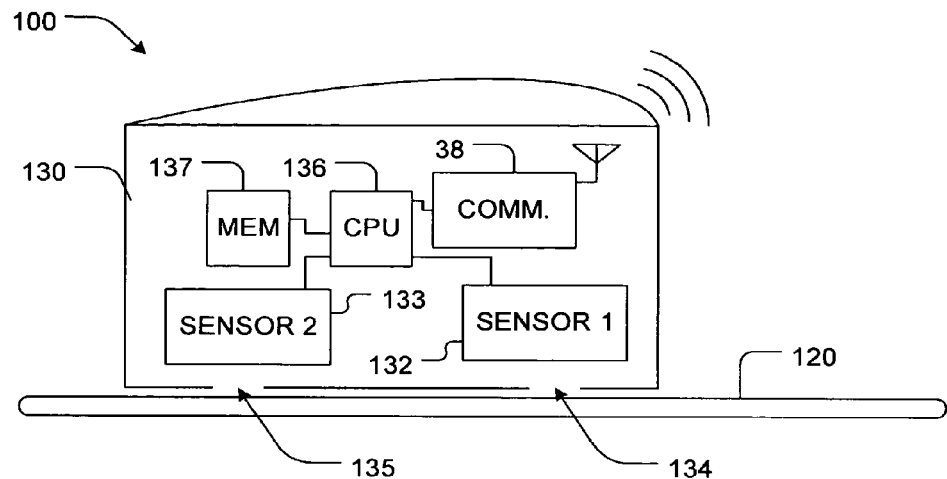
FIG. 7 illustrates data input device portion of the data input system in accordance with another embodiment of the present invention in more detail.
Figure 8:
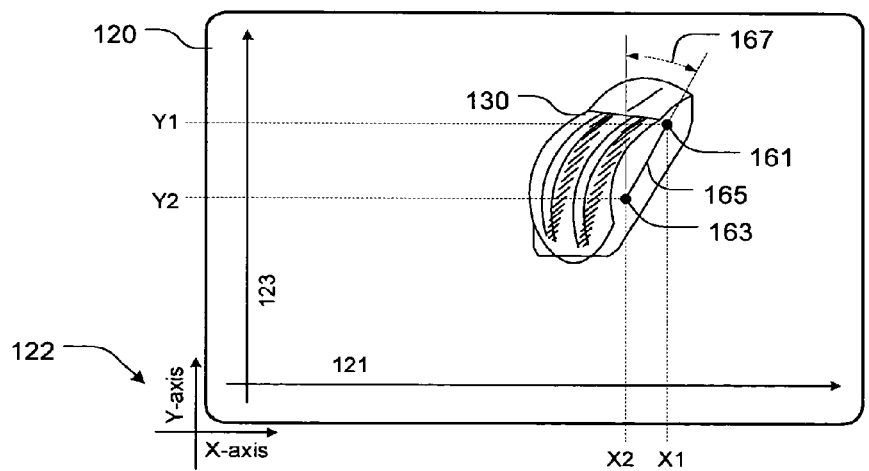
FIG. 8 illustrates encoded pad portion of the data input system of FIG. 7 in accordance in more detail.

FIG. 7 illustrates an alternative embodiment of the present invention. FIG. 7 includes a simplified block diagram of an alternative embodiment of an optical computer mouse 130 in accordance with the present invention and an alternative encoded pad 120. FIG. 8 includes a top view of the encoded pad 120.

Referring to FIGS. 7 and 8, the encoded pad 120 has position and orientation encoding including a variation of a first reflectance along a first axis (for example, the X-axis) of the encoded pad 120, the variation of the first reflectance material adapted to indicate positional information in the first axis of the encoded pad 120. Here, the encoded pad 120 also includes a variation of a second reflectance along a second axis (for example, the Y-axis) of the encoded pad 120, the variation of the second reflectance material adapted to indicate positional information in the second axis of the encoded pad 120. The first and the second axes are illustrated using encoded pad axes indicator 122. The variation of the first reflectance along the first axis (X-axis) is indicated using line ray 121. The variation 121 of the first reflectance can be implemented as varying levels of chromaticity of a color such as, for example, red. The variation of the second reflectance along the second axis (Y-axis) is indicated using line ray 123. The variation 123 of the second reflectance can be implemented as varying levels of chromaticity of a color such as, for example, blue. The encoded pad 120 can also include background chromaticity using another color such as, for example, green. The variations in the X-axis and the Y-axis can be linear variations.

The optical computer mouse 130 includes a first reflectance sensor 132 adapted to measure, at a first region 161 of the encoded pad 120, a first measure of reflectance and a second measure of reflectance via a first opening 134 of the mouse 130. For example, the first reflectance sensor 132 can be a single pixel color photo detector measuring chromaticity of red (first measure of reflectance) and measuring chromaticity of blue (second measure of reflectance). A processor 136, connected to the first reflectance sensor 132, is adapted or programmed to determine, from the first measure of reflectance, a first encoded value for position relative to a first axis of the encoded pad 120 and to determine, from the second measure of reflectance, a second encoded value for position relative to a second axis of the encoded pad 120. In short, in the illustrated sample embodiment, the first encoded value is translated into an X-axis position and the second encoded value is translated into a Y-axis position and, together, they represent the location of the first region 161 on the X-Y plane of the encoded plane 120. The location can be expressed as (X1, Y1). To translate the measured reflectances, a predetermined algorithm can be used. Alternatively, a conversion table within memory 37 of the input device 130 can be used for that purpose.

Likewise, the data input system 120 further includes a second reflectance sensor 133 adapted to measure, at a second region 163 of the encoded pad 120, a third measure of reflectance, measuring first reflectance at the second region 163, and a fourth measure of reflectance, measuring second reflectance at the second region 163 via a second opening 135 of the mouse 130. For example, the second reflectance sensor 133 can be a single pixel color photo detector measuring chromaticity of red (first measure of reflectance) and measuring chromaticity of blue (second measure of reflectance). The processor 136, also connected to the second reflectance sensor 133, is adapted or programmed to determine, from the third measure of reflectance, a third encoded value for position relative to a first axis of the encoded pad 120 and to determine, from the fourth measure of reflectance, a fourth encoded value for position relative to a second axis of the encoded pad 120. In short, in the illustrated sample embodiment, the third encoded value is translated into an X-axis position and the fourth encoded value is translated into a Y-axis position and, together, they represent the location of the second region 162 on the X-Y plane of the encoded plane 120. The location can be expressed as (X2, Y2).

The processor 136 is further programmed to determine, from the four measures of reflectance, an orientation angle of the data input device. The locations of the four measurements can be expressed as (X1, Y1) and (X2, Y2) and define a line 165. The line 165 can be expressed in slope intercept form where $$Y = mX + b$$

where
  m is the slope in rise over run format; and
  b is where the line 165 would intercept the Y-axis should it continue.

In an alternative embodiment, the openings 134 and 135 are the same opening and the sensors 132 and 133 are two sensors from a single color sensor array. The sensor array can be, for example, a CMOS (complementary metal-oxide semiconductor) color sensor array or a CCD (charge-coupled device) color sensor array.

Figure 9:
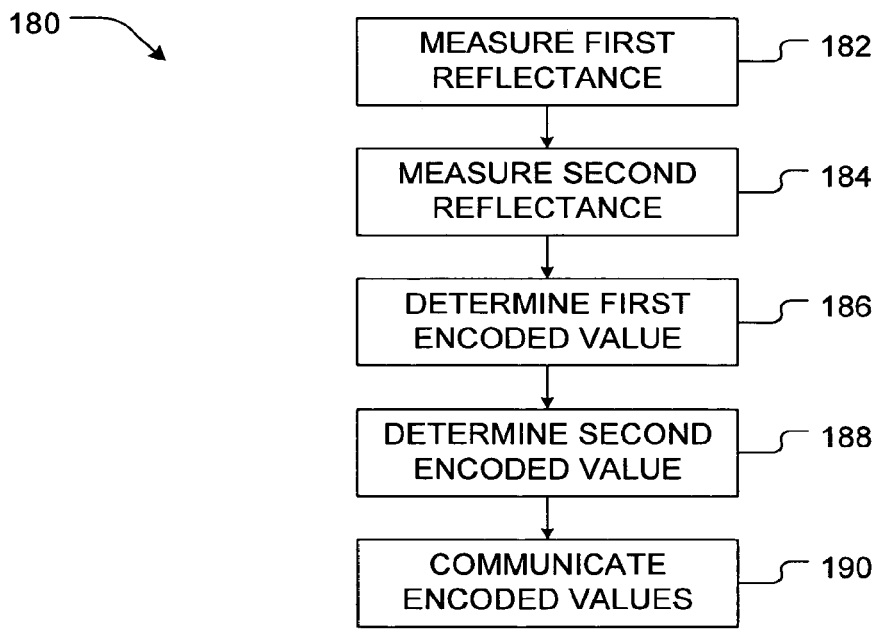
FIG. 9 is a flowchart illustrating yet another aspect of the present invention.

These steps of providing positional information are outline in a flowchart diagram 180 of FIG. 9. Referring to FIG. 9, a first measure of reflectance is measured at a first region 161 of the encoded pad 120. Step 182. Also, a second measure of reflectance is measured at the first region 161 of the encoded pad 120. Step 184. Then, from the first measure of reflectance, a first encoded value (X1) is determined for position relative to a first axis of the encoded pad 120. Step 186. Also, from the second measure of reflectance, a second encoded value (Y1) for position relative to a second axis of the encoded pad 120 is determined. Step 188. As before, these encoded values are communicated to a host computer via a communications module of the 38 of the mouse 130.

Further, for the second region 162 of the encoded pad 120, a third measure of reflectance and a fourth measure of reflectance are measured. From these measurements, a third encoded value (X2) and a fourth encoded value (Y2) are determined as already described. Also, using these four encoded values from the four measures of reflectance, orientation angle is determined as explained above. The third encoded value, the fourth encoded value, and the orientation angle are also communicated to the host computer.

From the foregoing, it will be apparent that the present invention is novel and offers advantages over the current art. Although specific embodiments of the invention are described and illustrated above, the invention is not to be limited to the specific forms or arrangements of parts so described and illustrated. For example, differing configurations, sizes, or materials may be used but still fall within the scope of the present invention. The invention is limited by the claims that follow.

What is claimed is:

1. A data input system comprising:
   an encoded pad having position encoding; and
   a data input device adapted to image a portion of said encoded pad to determine position and orientation of said data input device relative to said encoded pad;
   wherein the encoded pad further comprises:
   a linear variation of a first reflectance along a first axis of the encoded pad, the linear variation of the first reflectance material being formed in accordance to positional information in the first axis of the encoded pad; and
   a linear variation of a second reflectance along a second axis of the encoded pad, the linear variation of the second reflectance material being formed in accordance to positional information in the second axis of the encoded pad
   wherein each of the first and second reflectances is a wavelength dependent reflectance;
   a third reflectance uniformly distributed on the encoding pad, wherein position of the input device is computed through the ratio of the first reflectance to the third reflectance, and the ratio of the second reflectance to the third reflectance.

2. The data input system recited in claim 1 wherein said data input device is an optical computer mouse.

3. The data input system recited in claim 1 wherein said data input device comprises:
   a first reflectance sensor adapted to measure, at a first region of the encoded pad, a first measure of reflectance, measuring first reflectance at the first region, and a second measure of reflectance, measuring second reflectance at the first region;
   a processor connected said first reflectance sensor, said processor programmed to:
   determine, from the first measure of reflectance, a first encoded value for position relative to a first axis of the encoded pad; and
   determine, from the second measure of reflectance, a second encoded value for position relative to a second axis of the encoded pad.

4. The data input system recited in claim 3 further comprising:
   a second reflectance sensor adapted to measure, at a second region of the encoded pad, a third measure of reflectance, measuring first reflectance at the second region, and a fourth measure of reflectance, measuring second reflectance at the second region; and
   wherein said processor is connected to said second reflectance sensor, and said processor further programmed to:
   determine, from the third measure of reflectance, a third encoded value for position relative to the first axis of the encoded pad; and
   determine, from the fourth measure of reflectance, a fourth encoded value for position relative to the second axis of the encoded pad.

5. The data input system recited in claim 4 wherein said processor is further programmed to determine, from the four measures of reflectance, an orientation angle of the data input device.

6. The data input system recited in claim 4 wherein the first reflectance sensor is adapted to measure through a first opening, and the second reflectance sensor is adapted to measure through a second opening.

7. The data input system recited in claim 4 wherein the first and second reflectance sensors are adapted to measure through a common opening.

8. The data input system recited in claim 4 wherein the first and second reflectance sensors are two pixels of a single color sensor array.

9. The data input system recited in claim 4, wherein each of the first and second reflectance sensors is a single pixel color photo sensor.

10. An encoded pad having position and orientation encoding, the pad comprising:
    a linear variation of a first reflectance along a first axis of the encoded pad, the linear variation of the first reflectance material being formed according to positional information in the first axis of the encoded pad; and
    a linear variation of the second reflectance along a second axis of the encoded pad, the linear variation of the second reflectance material being formed according to positional information in the second axis of the encoded pad;
    wherein each of the first and second reflectances is a wavelength dependent reflectance;
    a third reflectance uniformly distributed on the encoding pad, wherein position of the input device is computed through the ratio of the first reflectance to the third reflectance, and the ratio of the second reflectance to the third reflectance.

11. An input system, comprising:
    an encoded pad having position encoding;
    variation of a first reflectance along a first axis of the encoded pad, the variation of the first reflectance material being formed uniquely according to positional information along the first axis;
    variation of a second reflectance along a second axis of the encoded pad, the variation of the second reflectance material being formed uniquely according to positional information along the second axis;
    an input device adapted to image a portion of the encoded pad;

a first sensor located in the input device for measuring the first and second reflectances;

a second sensor located on the input device for measuring the first and second reflectance; and a processor connected to first and second sensors, wherein the processor is adapted to compute at least an encoded position value from the measurement of the first and second reflectance;

further comprising a third reflectance uniformly distributed on the encoding pad, wherein position of the input device is computed through the ratio of the first reflectance to the third reflectance, and the ratio of the second reflectance to the third reflectance.

12. The input system recited in claim 11 is an optical computer mouse.

13. The input system recited in claim 12 wherein the first and second reflectance sensors are adapted to measure through a common opening located on the input device.

14. The input system recited in claim 11, wherein each of the first, second and third reflectances is a wavelength-dependent reflectance.

15. The input system recited in claim 11 wherein the first sensor is adapted to measure through a first opening on the input device, and the second reflectance sensor is adapted to measure through a second opening on the input device.

16. The input system recited in claim 11 wherein the first and second sensors are two pixels from a single color sensor array.

* * * * *